(12) United States Patent
Hogan

(10) Patent No.: US 7,783,514 B2
(45) Date of Patent: Aug. 24, 2010

(54) METHOD, APPARATUS AND ARTICLE FOR DISPLAYING TARGETED CONTENT ON WEB PAGES BY PREDICTING THE GROUP MEMBERSHIP OF INDIVIDUAL VISITORS

(75) Inventor: Daniel Edward Hogan, Bridgeport, CT (US)

(73) Assignee: NBC Universal, Inc., Universal City, CA (US)

( * ) Notice: Subject to any disclaimer, the term of this patent is extended or adjusted under 35 U.S.C. 154(b) by 2059 days.

(21) Appl. No.: 10/138,369

(22) Filed: May 3, 2002

(65) Prior Publication Data

US 2003/0212594 A1 Nov. 13, 2003

Related U.S. Application Data

(60) Provisional application No. 60/374,541, filed on Apr. 22, 2002.

(51) Int. Cl.
*G06Q 30/00* (2006.01)
*G06F 15/173* (2006.01)
(52) U.S. Cl. ............... 705/14.49; 705/14.73; 709/224
(58) Field of Classification Search ............ 705/14.49, 705/14.73; 709/224
See application file for complete search history.

(56) References Cited

U.S. PATENT DOCUMENTS

| 5,796,952 | A | * | 8/1998 | Davis et al. .............. 709/224 |
| 5,802,292 | A | | 9/1998 | Mogul |
| 5,848,396 | A | | 12/1998 | Gerace |
| 5,978,847 | A | | 11/1999 | Kisor et al. |
| 6,012,052 | A | | 1/2000 | Altschuler et al. |
| 6,029,195 | A | | 2/2000 | Herz |
| 6,055,569 | A | | 4/2000 | O'Brien et al. |
| 6,085,226 | A | | 7/2000 | Horvitz |
| 6,088,718 | A | | 7/2000 | Altschuler et al. |
| 6,167,441 | A | | 12/2000 | Himmel |
| 6,195,622 | B1 | | 2/2001 | Altschuler et al. |
| 6,195,651 | B1 | | 2/2001 | Handel et al. |
| 6,289,340 | B1 | | 9/2001 | Puram et al. |
| 6,321,221 | B1 | | 11/2001 | Bieganski |

(Continued)

OTHER PUBLICATIONS

Fielden, Tim, "Transcoding publisher reformats data", InfoWorld, v 22, n 2, pp. 59-60, May 29, 2000.*

(Continued)

*Primary Examiner*—Donald L Champagne
(74) *Attorney, Agent, or Firm*—GE Global Patent Operation; Roger C. Philips

(57) ABSTRACT

A method, apparatus and article for displaying targeted content on web pages by predicting the group membership of individual visitors based on data items relating to a web browser request for a web page. The method includes applying the data items to a set of transfer functions to obtain a series of confidence factors relating to a plurality of predefined visitor groups, selecting one of the plurality of visitor groups based on the series of confidence factors, selecting content targeted to the selected group, and delivering the selected targeted content to the web browser for display. Data items are extracted from a header accompanying the web browser request. These include browser type and version, operating system, referring URL and IP address. These data items are supplemented with data items derived from the data items present in the header, such as location, time of day, day of week, and industry cycles.

21 Claims, 3 Drawing Sheets

U.S. PATENT DOCUMENTS

| | | | |
|---|---|---|---|
| 6,327,574 | B1 | 12/2001 | Kramer et al. |
| 6,334,127 | B1 | 12/2001 | Bieganski et al. |
| 6,338,066 | B1 | 1/2002 | Martin et al. |
| 6,854,074 | B2 * | 2/2005 | McLellan et al. ............. 714/39 |
| 2003/0212594 | A1 * | 11/2003 | Hogan ......................... 705/14 |

OTHER PUBLICATIONS

InfoWorld Lead with Knowledge, Applications, Strategic News and Anaylsis Feb. 11, 2002; "Changing the Rules", Maggie, Biggs, InfoWorld Media Group, Inc., Feb. 11, 2002, Issue 6.

iXmatch: The Leading Matching Engine, iXmatch "For Mission Critical Matching", http://www.ixmatch.com/matching.html.

Net Perceptions, "Personalization Manager E-Commerce".

HNC Software, "The HNC Critical Action Technology Platform, Critical Action Through Advanced Science, A Technology White Paper", Oct. 2001, pp. 1-18.

Sadagopal G., "A Discussion on Matching Technology:Why You Need It" *iXmatch Inc.* 1-7 (2001).

* cited by examiner

METHOD, APPARATUS AND ARTICLE FOR DISPLAYING TARGETED CONTENT ON WEB PAGES BY PREDICTING THE GROUP MEMBERSHIP OF INDIVIDUAL VISITORS

CROSS REFERENCE TO RELATED APPLICATION

The present application claims priority from U.S. Provisional Application No. 60/374,541, filed on Apr. 22, 2002.

BACKGROUND OF THE INVENTION

The present invention is directed to a method, apparatus and article for displaying targeted content on web pages, and more particularly, to a method for predicting the group membership of individual visitors based on information obtained at the time of the initial page request to a web site to display the targeted content on the home page or other pages displayed to the visitor.

The Internet is clearly becoming the place of choice to obtain information on companies and products. Companies in turn are making efforts to provide content targeted to the individual visitors to their web sites. For example, many home pages attempt to highlight many different offerings, such as advertisements targeting students, investors, home product buyers, and business buyers. However, the majority of methods currently in use require that a visitor actively take steps to personalize a page before targeted content can be shown. On a portal site, logging in is not always feasible or desirable because the primary purpose of the home page of the portal is to quickly move visitors to other websites. For many visitors, the process of creating a profile and logging in wastes more time than the advantage of viewing personalized content.

There are currently several techniques in use for personalization of web content. In the registration-based personalization technique mentioned above, each visitor is issued a visitor name and password, which is linked to a profile stored by the server. The visitor logs in to receive personalized content. The time required to obtain the password and id and the difficulty in remembering them discourages visitors from logging onto many web sites. In addition, many visitors do not want to provide the personal information needed to create the profile.

Another technique is known as implicit personalization, in which web content is personalized without relying upon information explicitly provided by the visitor. One type of implicit information commonly used is visitor behavior, such as viewing pages or purchasing items. One example of this technique is described in U.S. Pat. No. 6,338,066, which discloses a method for predicting a given web surfer's behavior based on the behavior of past surfers. The method requires that the surfer take a certain number of actions and based on these initial actions content is displayed based on predicted future actions.

A third technique is based on locally stored preferences. In this method, the web application sets a cookie on the visitor's computer, which remembers certain settings, as explicitly set by the visitor. Reliance on the placement of a cookie is uncertain at best and in addition, privacy questions have been raised with regard to obtaining information about visitors from cookies, with or without the visitor's knowledge.

A fourth technique is known as location-based personalization. In this technique the visitor's location is determined and a page specific to that location is presented to the visitor. The location may be determined by explicit visitor selection, or through a service which returns location information based on IP address or other information obtained from the header accompanying the web page request.

Implementation of one or more of these techniques may use matching engines such as those described in U.S. Pat. No. 6,289,340 issued to iXmatch, Inc.; and U.S. Pat. Nos. 6,334,127 and 6,321,221, assigned to Net Perceptions, Inc.

All of these mechanisms, except for location-based personalization, require that a profile be maintained, either by the server, by the client, or both. Location-based personalization is limited in that it is unable to distinguish between multiple groups residing in the same physical location, or to distinguish between types of visitor activities that the same visitor might wish to perform at different times.

While not directed to personalization, U.S. Pat. No. 6,167,441 uses header information to determine the display capabilities of a browser and thereafter direct the browser to a URL that contains a version of the requested document within the display capability. The current intended purpose of the header information is to alter the markup language (code) that is sent to the browser so that the page is rendered correctly. The content itself is typically not changed based on header information.

There is a need for a technique that offers the benefits of the first three types of personalization (e.g. role-based delivery of content) without maintaining a profile of any kind for the visitor, and without requiring the visitor to log in or take any initial actions, so that targeted content can be provided on the home page or other web pages displayed to the visitor.

In addition, as more of the general public is able to access the Internet both at home and at work, the current trend is to significantly reduce the size and complexity of the home pages to make it easier for these new visitors. As a consequence, there will not be as much space available to advertise product offerings. Therefore, a system is needed that would maximize the use of this space by targeting content based on membership in a visitor group, while remaining completely transparent to the visitor.

BRIEF SUMMARY OF THE INVENTION

The present invention is directed to a method, apparatus and article for displaying targeted content on web pages by predicting the group membership of individual visitors. The method comprises the steps of:

(a) obtaining data items relating to a web browser request for a web page;

(b) applying the data items to a set of predictive transfer functions to obtain a series of confidence factors relating to a plurality of predefined visitor groups;

(c) selecting one of the plurality of predefined visitor groups based on the series of confidence factors;

(d) selecting content targeted to the selected group; and (e) delivering the selected targeted content to the web browser for display.

In accordance with the method of the present invention, data items are obtained by extracting visitor supplied data items directly from a header accompanying the web browser request. These items include browser type, browser version, operating system, referring URL and IP address. Visitor supplied data items are data that is directly contained within the header. In addition, supplemental data items are also obtained based on data in the header. These supplemental data items can be derived directly or indirectly from the header data. For example, the IP address can be used to query a geolocation database to obtain location related data, such as country, time zone, city, etc. Location related data is an example of data directly derived from the header. Data items indirectly derived from the header information are obtained by performing a calculation or other process such as a lookup, based on the header information and/or the location related data, and using the calculated data to obtain the supplemental data items. An example of indirectly derived data is the use of the time zone information to determine the time of day the browser request was received. Other indirectly derived supplemental data items include, day of week, day of month, as well as industry cycles and other events based on the time and date data. All of the data items described above, namely, the visitor supplied data items obtained directly from the header and the supplemental data items derived either directly or indirectly from the header are defined herein as data items relating to a web browser request.

Statistical or non statistical correlation techniques are used to develop the predictive transfer functions which link anonymous characteristics of web visitors to a series of groups, whose members have similar browsing patterns. Content is tagged and weighted according to its relevance to each group. In accordance with one exemplary embodiment of the present invention, the predictive transfer functions are of the form: $Y_n=aX_1+bX_2+cX_3\ldots$, where n is 1 to m predefined visitor groups, each Y is a confidence factor for membership in group n, each X is a different visitor characteristic, and each a, b, c ..., represents a weight factor for each X based on the relevance of each X to each $Y_n$. It should be obvious to anyone skilled in the art that Y could be any function of X, e.g. $Y_n=F(X_1\ldots X_m)$. Of course, it is likely to be computationally simpler if the equation is linear.

When a visitor requests a page from the server, whether the initial request for a page at a site or subsequent requests, group membership is determined by applying the data items to the transfer functions. The data items may be the visitor supplied data items, the supplemental data items or, both types of data items. Thereafter, content is served based on membership in one or more groups, while remaining completely transparent to the visitor. A best-fit matching algorithm can be used to select the content for that group best targeted to the visitor.

DETAILED DESCRIPTION OF THE INVENTION

The present invention allows full execution of personalized content delivery to be enabled starting with the very first page that a visitor requests from the server.

When a visitor requests a web page from a server, information about the browser and operating system are usually sent to the server as part of the request. This information, typically included in the header, is used to customize content on the page. These items include browser type, browser version, operating system, referring URL and IP address. Visitor supplied data items are data that is directly contained within the header. In addition, supplemental data items are also obtained based on data in the header. These supplemental data items can be derived directly or indirectly from the header data. For example, the IP address can be used to query a geolocation database to obtain location related data, such as country, time zone, city, etc. Location related data is an example of data directly derived from the header. Data items indirectly derived from the header information are obtained by performing a calculation or other process such as a lookup, based on the header information and/or the location related data, and using the calculated data to obtain the supplemental data items. An example of indirectly derived data is the use of the time zone information to determine the visitor's local time of day when the browser request was made. Other indirectly derived supplemental data items include, day of week, day of month, as well as industry cycles and other events based on the time and date data. All of the data items described above, namely, the visitor supplied data items obtained directly from the header and the supplemental data items derived either directly or indirectly from the header are defined herein as data items relating to a web browser request.

The present invention is based on the discovery that there is a correlation between browsing patterns and these visitor supplied data items. There is also a correlation between browsing patterns and the supplemental data items. These supplemental data items are obtained from either known or specially created lookup tables and/or databases.

Figure 2:
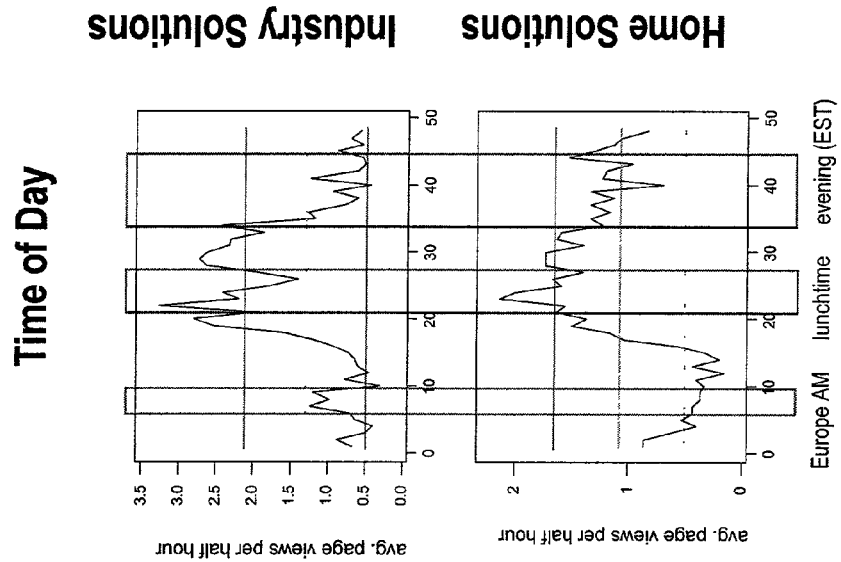
FIG. 2 is a chart showing an example of the correlation between browsing patterns and the Time of Day.
Figure 1:
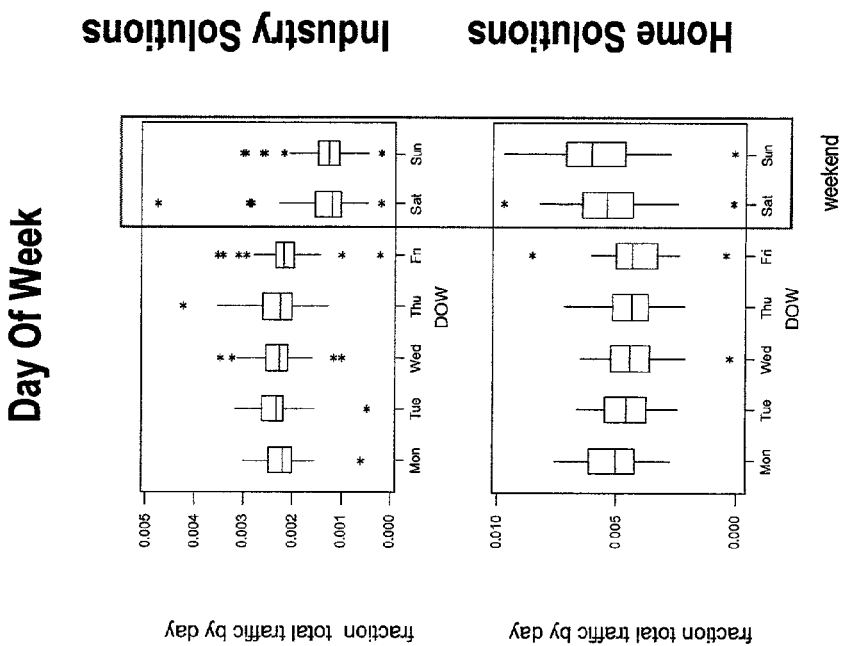
FIG. 1 is a chart showing an example of the correlation between browsing patterns and the day of the week.

The charts shown in FIGS. 1 and 2 present examples of the correlation between the Day Of The Week (FIG. 1) and the Time Of Day (FIG. 2) for content directed to Home Solutions and content directed to Industry Solutions, which are pages on a web site containing content relating to products for home and industry, respectively. FIG. 1 shows that Industry Solutions traffic decreases on weekends but Home Solutions traffic increases as a percent of the total traffic. FIG. 2 shows that Home Solutions traffic increases during lunchtime while Industry Solutions traffic falls significantly. These discoveries, along with the discovery that when multiple factors are combined they contribute to a higher confidence level, are among the factors that are the basis of the system of the present invention.

Execution of the personalized content delivery method of the present invention depends on two related processes. The first is an offline process wherein visitor groups are determined, content is tagged, and transfer functions are defined. The second process is an online process that selects and delivers content based on implicit visitor characteristics.

Offline Process

Step 1: Determine Visitor Groups. Define groups for visitors with similar browsing characteristics. For example, these can include Home Products, Investor Info, Industrial Products, Corporate Info, Business Finance, Press Materials, Consumer Finance and Careers.

Step 2: Determine and Classify Content. Using past data from web server log files and other sources, determine the one or more pieces of content that is of interest to each group and tag each piece of web content with a series of weights to indicate its applicability to each group as defined in step 1.

Step 3: Define Transfer Functions. The transfer functions can be any linear or non-linear function which represents the correlation between browsing patterns and the visitor supplied and supplemental data items obtained and/or derived from the browser request. For purposes of demonstration, a linear function will be used to simplify the discussion. However, it should be understood by anyone skilled in the art that any function of X, e.g. $Y_n=F(X_1\ldots X_m)$ can be used, with the trade-off that more complicated functions are likely to be more accurate, but computation time will be increased. In accordance with one exemplary embodiment of the present invention, the predictive transfer functions are of the form: $Y_n=aX_1+bX_2+cX_3\ldots$, where n is 1 to m predefined visitor groups, each Y is a confidence factor for membership in group n, each X represents a different data item, and each a, b, c ..., represents a weight factor for each X based on the relevance of each X to each Yn. The steps to define the transfer functions include:

Step 3A. Determine the Data Items. List all available information about the visitor as X's. In an exemplary embodiment, this might include:
   browser type
   browser version
   operating system
   referring URL
   IP address.
   This is the information that is available from the header of a web browser request.

This information can be augmented with supplemental data items from a geolocation dataset which may be able to provide:
   country
   time zone
   city
   state/province
   top-level domain
   secondary domain
   line speed
   connection type.
   Additional supplemental data items include:
   time of day
   day of week
   day of month
   day of quarter
   industry cycles
   financial event schedule
   product event schedule.

The supplemental data items are stored in lookup tables and/or databases for access upon a web browser request. There are known geolocation databases available that can be used, which can be customized as necessary. Application specific databases must be designed to accommodate the other supplemental data items. The supplemental data items is information that could be derived either directly or indirectly from the header information.

Step 3B. Determine Y's. Identify representative content from the one or more pieces of content from each group, to be used to determine the group membership of a visitor. For example, if "students" is a group, then "student portal main page" would be an appropriate piece of content to use as a Y.

Step 3C. Determine Transfer Functions. Using a data set based on web server log files (and other sources as necessary), use correlation techniques on the X's and Y's to produce a series of transfer functions.

There are a number of ways to create a transfer function. Which method to use might depend on one or more of the following:
   Amount of data available
   Type of data available
   Development time
   Familiarity with statistical techniques
   Business criticality of accuracy Examples of possible ways to create transfer functions follow.

(1) Best-guess estimation. It is possible to create transfer functions based purely on a logical review of the data. For example, if web server log files show that visitors use the following operating systems when visiting a particular site:
   Windows 95
   Windows 98
   Windows XP
   Windows ME
   Windows NT
   Windows 2000

Then it is reasonable to assume that visitors using Windows NT and Windows 2000 are more likely to be at work than visitors using the other versions of Windows, because NT and 2000 were developed for and marketed toward business users. Therefore, transfer functions could be created as follows:

I. Define Variables. In the example below, the value of the variable is defined to be 1 when true and 0 when false. Under normal circumstances, the HTTP request header will indicate only one OS version.
$X_1$=OS is Windows 95
$X_2$=OS is Windows 98
$X_3$=OS is Windows XP
$X_4$=OS is Windows ME
$X_5$=OS is Windows NT
$X_6$=OS is Windows 2000
$Y_1$=Business User
$Y_2$=Home User II. Create Transfer Functions $$Y_1=X_5+X_6$$

$$Y_2=X_1+X_2+X_3+X_4$$

To develop a more sophisticated transfer function, additional criteria could be employed. Suppose we introduce the following additional X's and additional Y:
$X_7$=Top-level Domain is GOV
$X_8$=Top-level Domain is ORG
$X_9$=Top-level Domain is EDU
$Y_3$=Student It is reasonable to assume that visitors having a Top-level domain (TLD) equal to GOV are accessing the Internet from work, and that visitors with TLD equal to EDU are accessing from a school and are therefore likely to be students. Visitors having a TLD equal to ORG are probably more likely to be business users, but it is not a strong indicator. Having a TLD of COM doesn't necessarily indicate membership in any of the three groups defined. Therefore, it will be left out of the example transfer functions.

The transfer functions could be modified as follows:

$$Y_1=0.8*(X_5+X_6)+0.2*(0.9*X_7+0.1*X_8)$$

$$Y_2=0.9*(X_1+X_2+X_3+X_4)$$

$$Y_3=X_9$$

In this example, TLD only has a 20% impact on the determination of whether or not a visitor is determined to be a business user, whereas operating system version has an 80% impact. Likewise, a TLD of GOV carries more weight (90%) than a TLD of ORG, within the narrower consideration of top-level domain. In this example, the maximum expected value of the second transfer function is 0.9, which allows the first and third rules to take precedence over it. In other words, in case of a tie, where the user is running Windows 95 and TLD is EDU, the third equation will return the higher value, which will cause the user to be determined to be a student, which is reasonable.

(2) Visualization. Graphing the data may show patterns that lead to the creation of transfer functions. For example, in the graph of FIG. 1 showing industry solutions and home solutions traffic by day of week, there is a visual indication that visitors are more likely to visit home solutions pages rather than industry solutions pages on weekends. In this example, the graph's X axis shows the factors (X's). The graph's Y axis shows number of page views for one or more pages. It is important that the pages graphed on the Y axis be clearly connected with a group. In the example above, it can be reasonably assumed that home solutions page traffic is generated by visitors looking for home products, and industry solutions page traffic is generated by visitors looking for business products. This allows the connection to be made between X's and group membership.

Based on this graphical analysis, transfer functions can be produced as in the previous approach.

(3) Hypothesis Testing. It should be apparent to anyone familiar with the relevant branch of statistics that hypothesis testing could be used to determine which factors (X's) are statistically significant. For example, a t-test might be performed to determine whether day of week being weekend or weekday was a statistically significant factor in determining if visitors are more likely to be seeking home products or business products (using the same method of choosing a representative page, such as industry solutions or home solutions, as in the visualization approach). Of course, the correct hypothesis test must be chosen based on the type and nature of the data, according to generally accepted statistical principles and methods.

Once a factor is determined to be statistically significant, it can be added to the transfer function(s).

The following Table I shows the result of an ANOVA performed on example data showing that traffic to an industry solutions page on weekends is statistically different from traffic on weekdays. Therefore, day of week being weekend or weekday can be determined to be a significant factor in predicting membership in the "business user" group.

relationships between variables not apparent using the above methods, statistical regression techniques can be employed.

A computer program such as Minitab can be used to make the calculations easier to perform. The data for the regression could be structured as shown in Table II below:

TABLE II

| Column A Target PV/ Total PV | Column B Session # | Column C Browser | Column D Oper. Sys | Column E Session Start Time | Column F Day of Week |
|---|---|---|---|---|---|
| 0 | 1 | 3.01 | 1 | 1.16 | 0 |
| .18 | 2 | 4.0 | 0 | 5.33 | 1 |
| .9 | 3 | 5.5 | 1 | 6.5 | 1 |
| .28 | 4 | 3.0 | 0 | 14.75 | 1 |
| .44 | 5 | 4.06 | 0 | 23.12 | 2 |
| .31 | 6 | 5.5 | 1 | 11.19 | 2 |
| .77 | 7 | 6.0 | 1 | 12.30 | 5 |
| ... | ... | ... | ... | ... | ... |

In this example, each row represents a unique user session as recorded by the web server. Columns are defined as follows:

Column A: Page views for a page representing a user group (e.g. home solutions page) divided by the total number of page views for the session Column B: Session number, numbered sequentially in this case Column C: Version number of the browser, or zero if not available Column D: A number indicating whether the user's operating system is a business OS or a consumer OS. 1=business OS, 0=consumer OS or unknown.

Column E: The local (visitor's) time when the session started, converted to a 24-hour decimal format. 6:30 AM is represented as 6.5; 2:45 PM is represented as 14.75.

Column F: A number representing the local (visitor's) day of week when the session was started, with Monday=0, Tuesday=1, Wednesday=2 etc. A value of zero or a best-guess is used if the visitor's day of week is not known.

Once this data is collected and properly formatted, regression can be performed by using Column A as the Response

TABLE I

```
                      Individual 95% CIs For Mean
                      Based on Pooled StDev
Level   N    Mean    StDev  ----------+---------+---------+------

Fri     52  1025.0   566.9                     (----*----)
Mon     52  1154.5   578.5                         (---*----)
Sat     52   458.3   520.2  (----*----)
Sun     52   477.0   541.1  (----*----)
Thu     52  1168.3   554.3                         (----*----)
Tue     52  1262.5   565.6                             (----*----)
Wed     52  1221.2   415.2                           (----*----)
                            ----------+---------+---------+------
Pooled       537.1           600       900       1200
StDev=
```

Again, this same technique can be repeated for multiple X's and for multiple user groups.

(4) Regression. Visualization and hypothesis testing help to identify significant X's, but do not produce exact formulas to be used as transfer functions. This is not necessarily a serious drawback, since the prediction of group membership using the present method is not intended to be exact. However, in order to be as precise as possible, or to discover non-linear and Columns C, D, E, and F as Predictors. In this example, the session number is known beforehand to not be statistically significant. This will result in a formula where the value for Column A, which is also the confidence factor, or Y, for membership in the group, is given as a function of the values for columns C, D, E, and F. It is conceivable that some columns (X's) will not be statistically significant and will not appear in the final equation. Likewise, it is conceivable that in order to achieve the level of statistical significance desired, it would be necessary to use additional X's in the regression. This should be clear to anyone experienced with statistical regression techniques.

Given the very small data set shown in the example above, Minitab calculates the following transfer function:

$$A = -0.627 + 0.222*B - 0.017*C + 0.0097*D - 0.022*E$$

Where A, B, C, D, and E are the columns as defined above. In practice, more data would be necessary in order to make the results statistically significant. This data is shown for illustrative purposes only.

This process could be repeated for a series of target pages, thus producing a series of transfer functions that produce confidence factors that a particular visitor should be considered as part of a particular group.

Online Process

All available data items (X's) are collected at the beginning of a visitor session. The data items may be the visitor supplied data items, the supplemental data items or both types of data items. To these X's, each transfer function is applied to obtain a series of confidence factors, $Y_1 \ldots X_n$, representing the chance that the visitor falls into groups 1 . . . n. These weights are matched with content weights (as defined in the offline process, step 2) using, for example, a best-fit matching algorithm, and the resulting content is displayed to the visitor.

The benefits of the present invention over existing techniques include of the following.

There is no login required. This eliminates the steps involved with obtaining and maintaining visitor id's and passwords, the difficulty for visitors to remember them, and the time necessary to enter them.

There is no need for visitors to specify what group they belong to. This saves time for visitors and means that everyone that comes to the site will be able to take advantage of personalization, whether or not they take the time to personalize. Many visitors fail to take advantage of personalization because of the effort involved to set up a profile.

There is less data storage required. Profiles are not stored for individual visitors, which can be a data storage problem for sites with a large number of visitors.

The system is better for privacy. Since profiles are neither created nor stored for visitors, issues with various privacy laws are avoided.

There are no cookies required. Some personalization techniques require that cookies are enabled on the browser, which increasingly is not a safe assumption.

There is no ramp-up time. The personalization scheme works fully on the first page view of the first visitor visit to a site. Personalization based on clickstreams or other visitor activity often takes many return visits before it begins to be accurate.

Figure 3:
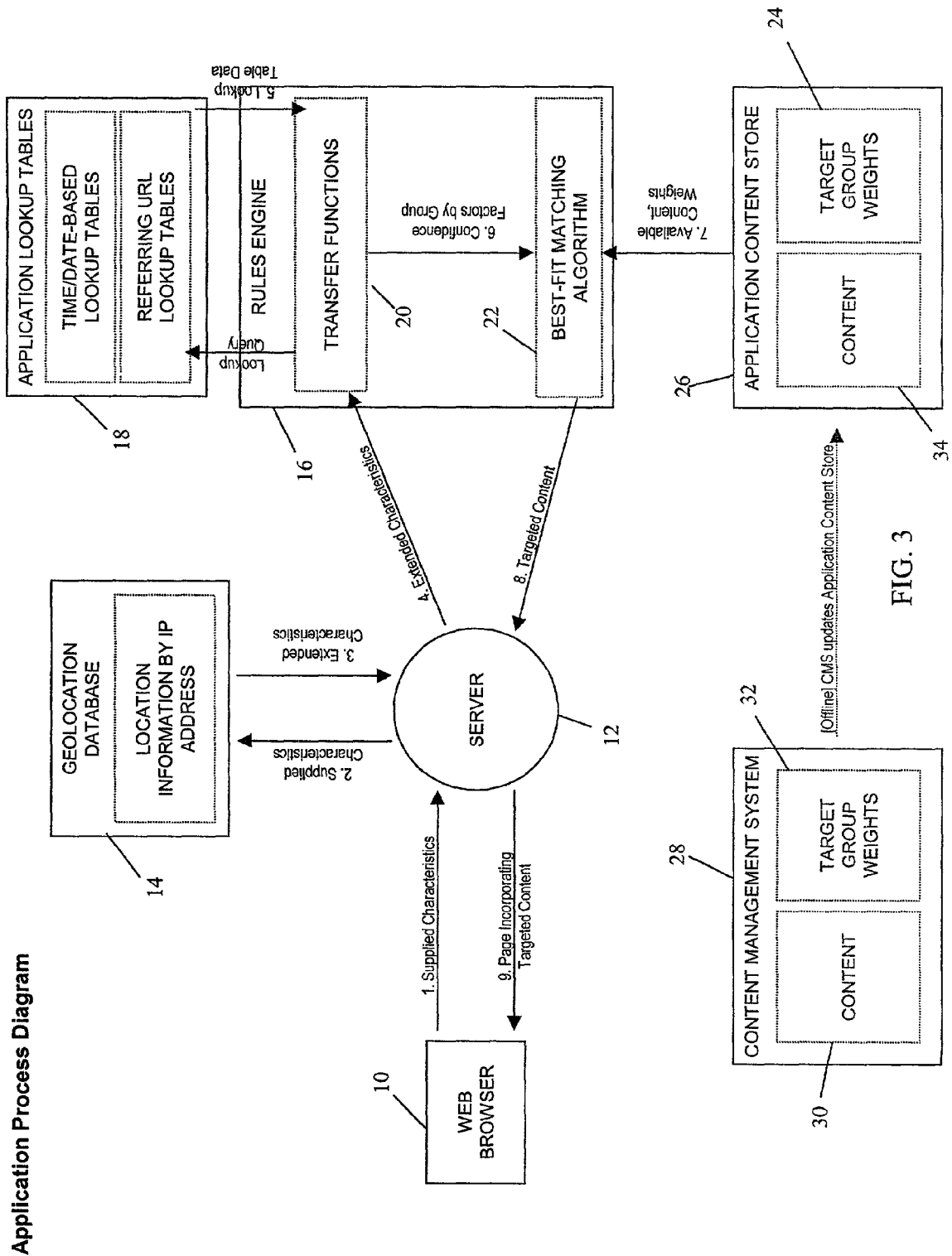
FIG. 3 is a process diagram of the method of the present invention.

Turning now to FIG. 3, there is shown a process diagram of the method of the present invention.

Step 1. The process starts when a web browser 10 requests a page from a server 12. In one example, iPlanet Portal is the Server. The server extracts the visitor supplied data items such as browser type and version, referring URL and operating system from the HTTP request headers.

Step 2. The server performs a lookup based on the IP address of the requestor at geolocation database 14 to obtain the supplemental location data items identified above. In one example, Quova provides the geolocation information.

Step 3. These supplemental data items about the visitor obtained from the location lookup are returned to the server.

Step 4. All of the visitor supplied and geolocation data items known about the visitor are passed to the Rules Engine 16. In one example, a BLAZE/HNC Rules Engine is used.

Step 5. The rules engine 16 augments this information about the visitor with the additional supplemental data items described above, such as browsing patterns by time of day, day of week, day of month, day of quarter, etc., from additional lookup tables 18. Information about industry cycles would also be returned in this step. The rules engine 16 is also capable of querying the lookup tables 18 to determine the relationship between certain referring URL's (or URL patterns) and group membership. The lookup tables 18 are data specific tables that are custom designed depending on the application for which this system is employed to contain the desired supplemental data items.

Step 6. Confidence factors for membership in each group are calculated based on all or a subset of all available data items by using pre-determined transfer functions 20.

Step 7. A best-fit matching algorithm 22 determines the most relevant content based on the weights 24 in the content store 26 and the confidence factors for the visitor as computed by the transfer functions 20. Content management system 28 stores offline all content 30 and related target group weights 32 for the web site. Periodic updates of the content 30 and weights 32 of the content management system 28 are transferred to application content store 26.

Step 8. The rules engine 16 returns to the server 12 the content 34 determined to be most relevant for this visitor.

Step 9. The server 12 combines this targeted content along with other (non-targeted) page content and returns the complete page to the visitor's web browser 10.

The present invention is not limited to the use of a best-fit match algorithm for content, as described above in the online process. However, the following is an example where it would lead to better content being served to the visitor as compared to choosing the group with the highest confidence factor ($Y_n$).

As part of the offline process (step 2), weights are assigned to each piece of content. For example, with the following scale:

0—Do not target
1—Target if no other content available
3—Moderately target
9—Strongly target
10—Mandatory content for this group Suppose there are two different pieces of content ranked as follows:

| Page | Student | Investor | Home Visitor |
|---|---|---|---|
| Appliances Home | 1 | 1 | 9 |
| Appliances History | 3 | 3 | 9 |

Now suppose there are two visitors that access the system that are assigned confidence factors (Yn's) as follows:

| Visitor | Student | Investor | Home Visitor |
|---|---|---|---|
| Visitor A | 10% | 15% | 80% |
| Visitor B | 40% | 45% | 80% |

In trying to match content to a visitor, if you only looked at the "winning" group (the one with the highest confidence factor), then you would determine that both visitors are Home Visitors, and then have to randomly decide whether to show them Appliances Home or Appliances History.

However, if you used a best-fit matching algorithm, you would take into account the fact that there is a possibility that Visitor B could also be interested in investing or student information. By not throwing out this data, you can make a better match. In this case, Visitor A would get Appliances Home (which is intended to be more strongly targeted toward home visitors), and Visitor B would be shown Appliances History (which has a broader appeal).

One way to do this is a least-squares fit, as follows (translate 10% to 1, 15% to 1.5, etc):

| | |
|---|---|
| Visitor A, Appliances Home: | $(1-1)^2 + (1-1.5)^2 + (9-8)^2 = 1.25$ |
| Visitor A, Appliances History: | $(3-1)^2 + (3-1.5)^2 (9-8)^2 = 7.25$ |
| Visitor B, Appliances Home: | $(1-4)^2 + (1-4.5)^2 + (9-8)^2 = 22.25$ |
| Visitor B, Appliances History: | $(3-4)^2 + (3-4.5)^2 + (9-8)^2 = 4.25$ |

With this method, low scores are better. You can see that these page decisions match what was chosen logically above. If a least-squares fit cannot be used because of the complexity of the calculation, a number of different, standard matching algorithms will work.

Figure 4:
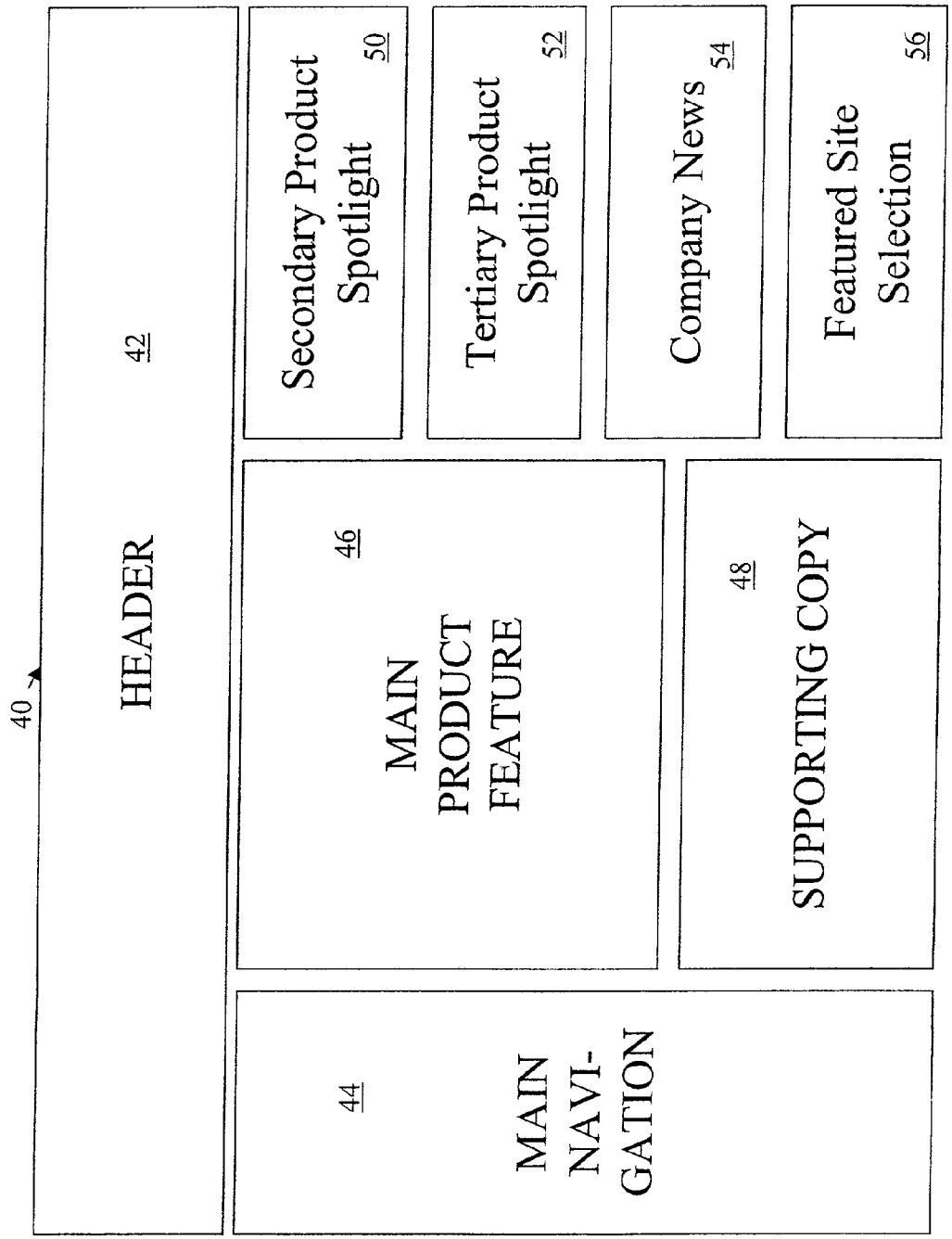
FIG. 4 is a layout of a main web page showing how the targeted content is displayed.

FIG. 4 shows an example of content that might appear on a main page 40 of a company web site employing the present method. In this example, the Header 42 and Main Navigation 44 would remain the same for all site visitors. Main Product Feature 46 and Supporting Copy 48 would change based on predicted group membership. The content store 26 of FIG. 3 would hold a series of product features, each ranked based on their applicability to different groups. This might include all products that a company markets, or it may be a subset deemed particularly appropriate for marketing on the web.

The Secondary Product Spotlight 50 and Tertiary Product Spotlight 52 could either be the number 2 and number 3 matches from the same pool of content, or they could be different pieces of content created specifically for this area of the page.

Company News 54 could be filtered based on predicted group membership, to show the news most relevant to the visitor, with the most important news marked as mandatory in the content management system 28 (FIG. 3) so that all visitors would see it regardless of predicted group membership.

Featured Site Section 56 is another example of a piece of content, wholly separate from the other pieces of content on the page, which might be chosen based on the present method.

An exemplary hardware environment of the preferred embodiment of the present invention is a typical distributed computer system, wherein client computers are connected via a network to server computers. A typical combination of resources may include clients that are personal computers or workstations, and servers that are personal computers, workstations, minicomputers, and/or mainframes. The network preferably comprises the Internet, although it could also comprise intra-nets, LANs, WANs, SNA networks, etc. Surfers of the Internet typically use client computers to surf on the World Wide Web.

Each of the computers, be they client or server, generally include, inter alia, a processor, random access memory (RAM), data storage devices, data communications devices, monitor, visitor input devices, etc. Those skilled in the art will recognize that any combination of the above components, or any number of different components, peripherals, and other devices, may be used with the client and server.

Each of the computers, be they client or server, operate under the control of an operating system, such as UNIX®, Windows®, Linux® etc. The operating system is booted into the memory of the computer for execution when the computer is powered-on or reset. In turn, the operating system then controls the execution of one or more computer programs by the computer.

In the present invention, the operating system of the client controls the execution of a web browser and the operating system of the server controls the execution of a web server. The web browser is typically a computer program such as NetScape®, Internet Explorer®, etc. The web server is typically a computer program such as a World Wide Web daemon.

The present invention is usually (although not necessarily) implemented by a computer program and its associated history log database (also known as a web server log) that are executed, interpreted, and/or stored in at least one of the servers under the control of that server's operating system. This computer program, may be a separate computer program or may be implemented within the operating system or the web server, and its associated database. The computer program causes the server to perform the desired functions as described herein.

The operating system, web server, and computer program are comprised of instructions which, when read and executed by the server, causes the server to perform the steps necessary to implement and/or use the present invention. Generally, the operating system, web server, computer program, and/or database are tangibly embodied in and/or readable from a device, carrier, or media, such as a memory, data storage device, and/or data communications device connected to the server. The tangible embodiments of memory are illustrative and not intended to limit the scope of the present invention. Under control of the operating system, the web server, computer program, and/or database may be loaded from the memory, data storage device, and/or data communications device into the memory of the server for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

While the invention has been particularly shown and described with respect to exemplary embodiments thereof, it will be understood by those skilled in the art that the foregoing and other changes in form and details may be made therein without departing from the spirit and scope of the invention that should be limited only by the scope of the appended claims.

What is claimed is:

1. A method for displaying targeted content on web pages displayable via web browsers used by individual visitors by predicting group membership of the individual visitors, comprising the steps of:

(a) characterizing a plurality of visitor groups;

(b) extracting individual data items exclusively from a header of a web browser request that is supplied by an individual visitor;

(c) applying the data items to a set of predictive transfer functions to obtain a series of confidence factors relating to the visitor groups;

(d) selecting one visitor group from the visitor groups based on the series of confidence factors;

(e) selecting content targeted to the selected visitor group; and (f) delivering the selected targeted content to the web browser of the individual visitor for display.

2. The method of claim 1 further comprising obtaining supplemental data items from lookup tables and/or databases.

3. The method of claim 2 further comprising obtaining location specific data items relating to an IP address of the individual visitor extracted from the header.

4. The method of claim 1 further comprising utilizing a best-fit matching algorithm for the selecting one of the groups based on the series of confidence factors, and for the selecting content targeted to the selected group.

5. The method of claim 4 wherein the best-fit matching algorithm further comprising utilizing a least-squares fit algorithm.

6. The method of claim 1 further comprising the predictive transfer functions having a form of: $Y_n = F(X_1 \ldots X_m)$, where n is 1 to m groups, each Y is a confidence factor for membership in group n, and each X represents a different data item.

7. The method of claim 6 further comprising the predictive transfer functions having a form of: $Y_n = aX_1 + bX_2 + cX_3 \ldots$, where n is 1 to m groups, each Y is a confidence factor for membership in group n, each X represents a different data item, and each a, b, c . . . , represents a weight factor for each X based on the relevance of each X to each $Y_n$.

8. The method of claim 1 further comprising applying statistical regression techniques to develop the predictive transfer functions to link anonymous characteristics of individual visitors to the groups, whose members have similar browsing patterns, and tagging and weighting content according to its relevance to each group.

9. The method of claim 1 further comprising displaying the targeted content on the first web page presented to the individual visitor.

10. The method of claim 1 further comprising obtaining one or more of: browser type, browser version, operating system, referring URL, and IP address, as the individual visitor supplied data items.

11. The method of claim 2 further comprising obtaining one or more of: time of day, day of week, day of month, day of quarter, industry cycles, financial event schedule, and product event schedule, as the supplemental data items.

12. The method of claim 3 further comprising obtaining one or more of: country, time zone, city, state/province, top-level domain, secondary domain, line speed, and connection type, as the location specific data items.

13. An apparatus for displaying targeted content on web pages displayable via web browsers used by individual visitors by predicting group membership of the individual visitors, comprising:

a network server with a memory; and a computer program, performed by the network server, for:

(a) characterizing a plurality of visitor groups having similar browsing patterns;

(b) extracting individual data items exclusively from a header of a web browser request that is supplied by an individual visitor;

(c) applying the data items to a set of predictive transfer functions to obtain a series of confidence factors relating to the groups;

(c) selecting one visitor group from the visitor groups based on the series of confidence factors;

(d) selecting content targeted to the selected visitor group; and (e) delivering the selected targeted content to the web browser of the individual visitor for display.

14. The apparatus of claim 12 further comprising supplemental data items obtained from lookup tables and/or databases.

15. The apparatus of claim 14 further comprising supplemental data items including location specific data items relating to an IP address of the individual visitor extracted from the header.

16. The apparatus of claim 12 wherein the server comprises a rules engine for storing the transfer functions and applying the data items to the transfer functions.

17. The apparatus of claim 16 wherein the rules engine utilizes a best-fit matching algorithm.

18. The apparatus of claim 17 further comprising a content memory for storing a plurality of content and target group weights for the content.

19. The apparatus of claim 18 further comprising the best-fit matching algorithm selects the targeted content based on the target group weights obtained from the content memory and the confidence factors determined by the transfer functions.

20. The apparatus of claim 19 further comprising lookup tables containing the supplemental data items and the rules engine queries the lookup tables for the supplemental data items.

21. The apparatus of claim 20 further comprising a geolocation database containing the location specific data items and the network server utilizes the IP address of the visitor to obtain the location data specific to the visitor.

* * * * *